(12) United States Patent
Shepherd et al.

(10) Patent No.: US 7,219,039 B1
(45) Date of Patent: *May 15, 2007

(54) METHOD FOR GENERATING A MESH REPRESENTATION OF A REGION CHARACTERIZED BY A TRUNK AND A BRANCH THEREON

(75) Inventors: Jason Shepherd, Albuquerque, NM (US); Scott A. Mitchell, Albuquerque, NM (US); Steven R. Jankovich, Anaheim, CA (US); Steven E. Benzley, Provo, UT (US)

(73) Assignee: Sandia Corporation, Albuquerque, NM (US)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 562 days.

(21) Appl. No.: 09/788,053

(22) Filed: Feb. 16, 2001

Related U.S. Application Data

(60) Provisional application No. 60/226,444, filed on Aug. 17, 2000.

(51) Int. Cl.
*G06F 17/50* (2006.01)
*G06F 7/48* (2006.01)
*G06T 15/00* (2006.01)

(52) U.S. Cl. .................... 703/2; 703/1; 703/6; 345/419
(58) Field of Classification Search ................. 703/2, 703/9, 6, 1, 7; 705/1; 345/419
See application file for complete search history.

(56) References Cited

U.S. PATENT DOCUMENTS

| | | | | |
|---|---|---|---|---|
| 4,534,003 A | * | 8/1985 | Manzione | 700/200 |
| 5,806,521 A | * | 9/1998 | Morimoto et al. | 600/447 |
| 5,963,459 A | * | 10/1999 | Burnett et al. | 703/5 |
| 6,195,625 B1 | * | 2/2001 | Day et al. | 703/7 |
| 6,356,860 B1 | * | 3/2002 | Barnette | 703/2 |
| 6,560,570 B1 | * | 5/2003 | Dohrmann et al. | 703/7 |
| 6,842,725 B1 | * | 1/2005 | Sarda | 703/10 |
| 6,917,907 B2 | * | 7/2005 | Hsi et al. | 703/8 |
| 6,985,867 B1 | * | 1/2006 | Pryor et al. | 705/1 |

OTHER PUBLICATIONS

Eppstein-D., "Linear Complexity Hexahedral Mesh Generation", ACM 1996 p. 58-67.*

Jankovich et al., "The Graft Tool" An All-Hexahedral Transition Algorithm for Creating A Multi-Directional Swept Volume Mesh p. 1-8.*

(Continued)

*Primary Examiner*—Anthony Knight
*Assistant Examiner*—Tom Stevens
(74) *Attorney, Agent, or Firm*—Madelynne J. Farber

(57) ABSTRACT

The present invention provides a meshing method, called grafting, that lifts the prior art constraint on abutting surfaces, including surfaces that are linking, source/target, or other types of surfaces of the trunk volume. The grafting method locally modifies the structured mesh of the linking surfaces allowing the mesh to conform to additional surface features. Thus, the grafting method can provide a transition between multiple sweep directions extending sweeping algorithms to 2¾-D solids. The method is also suitable for use with non-sweepable volumes; the method provides a transition between meshes generated by methods other than sweeping as well.

22 Claims, 2 Drawing Sheets

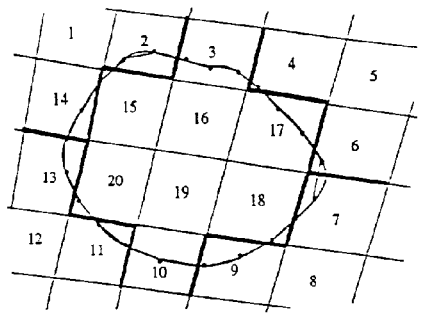

An example graft surface with underlying structured mesh from the base surface.

OTHER PUBLICATIONS

Benzley et al., "A Comparison of All-Hexahedral and All-Tetrahedral Finite Element Meshes for Elastic and Elasto-Plastic Analysis," *Proceedings 4th International Meshing Roundtable, Sandia National Laboratories* 95, pp. 179-191 (Oct. 1995).

Cifuentes and Kalbag, "A Performance Study of Tetrahedral and Hexahedral Elements in 3-D Finite Element Structural Analysis," *Finite Elements en Analysis and Design*, vol. 12, pp. 313-318 (1992).

Mitchell, "A Characterization of the Quadrilateral Meshes of a Surface Which Admit a Compatible Hexahedral Mesh of the Enclosed Volume," *Proceedings, 13th Annual Symposium on Theoretical Aspects of Computer Science (STACS '96), Lecture Notes in Computer Science 1046*, Springer, pp. 465-476 (1996).

Staten et al., "BMSweep: Locating Interior Nodes During Sweeping," *Proceedings 7th International Meshing Roundtable* 98, pp. 7-18 (Oct. 1998).

Blacker, "The Cooper Tool," *Proceedings 5th International Meshing Roundtable* 96, pp. 13-29 (Oct. 1996).

Mingwu and Benzley, "A Multiple Source and Target Sweeping Method for Generating All Hexahedral Finite Element Meshes" *Proceedings, 5International Meshing Roundtable* 96, pp. 217-225 (Oct. 1996).

White, "Automatic, Quadrilateral and Hexahedral Meshing of Pseudo-Cartesian Geometries using Virtual Decomposition," *Master's Thesis, Brigham Young University* (Aug. 1996).

Tautges et al., "The Whisker Weaving Algorithm: A Connectivity-based Method for Constructing All-hexahedral Finite Element Meshes," *International Journal for Numerical Methods in Engineering*, vol. 39, pp. 3328-3349 (1996).

Canann,"Plastering: A New Approach to Automated, 3-D Hexahedral Mesh Generation," *American Institute of Aeronautics and Astronics*, (1992).

Meyers et al., "The "Hex-Tet" Hex-Dominant Meshing Algorithm as Implemented in CUBIT;" *Proceedings 7International Meshing Roundtable* 98, pp. 151-158, (Oct. 1998).

Murdoch and Benzley, "The Spatial Twist Continuum", *Proceedings, 4th International Meshing Roundtable* 95, pp. 243-251 (Oct. 1995).

Mitchell and Tautges, "Pillowing Doublets: Refining a mesh to ensure that faces share at most one edge" on the web at endo.sandia.gov/~samitch/pillowing-doublets.pdf.

* cited by examiner

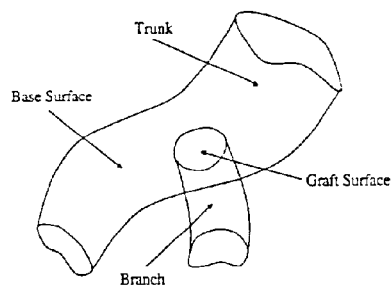

Figure 1. Definition of terms for a 2¾-D solid.

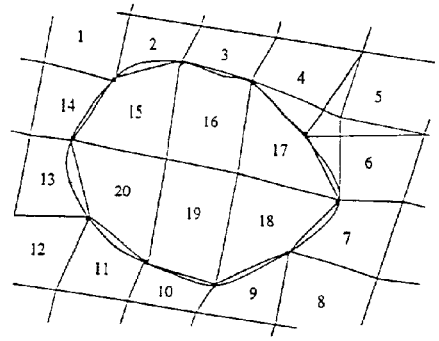

Figure 4. The base surface mesh is completely smoothed to the loop.

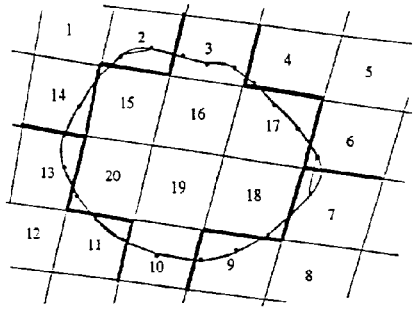

Figure 2. An example graft surface with underlying structured mesh from the base surface.

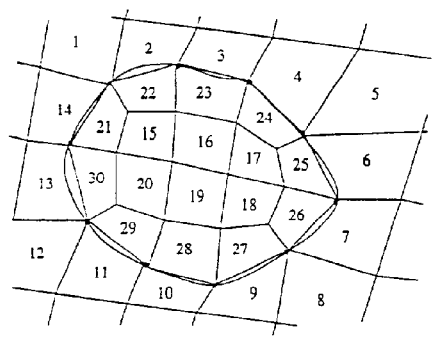

Figure 5. A pillow of elements is inserted directly inside the loops to improve element quality.

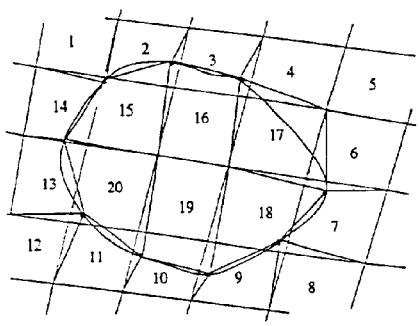

Figure 3. The nodes of the intersecting edges are moved to the loop.

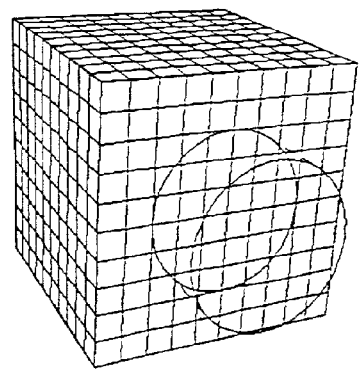

Figure 6. Mapped trunk mesh with cylinder branch before grafting.

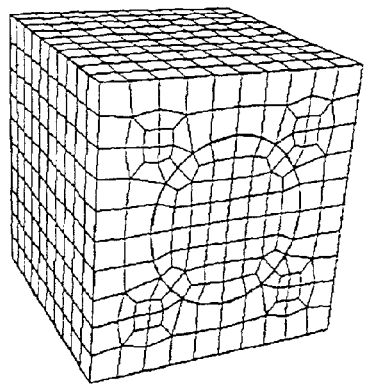

Figure 7. Cut away view of the base surface after grafting.

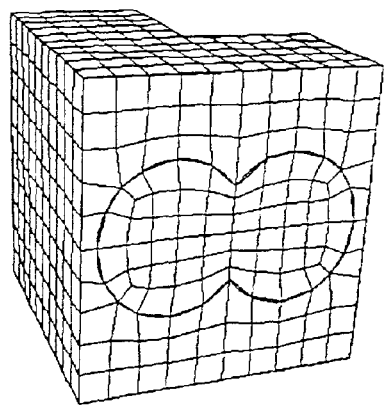

Figure 10. Cut away view of the base surface after grafting.

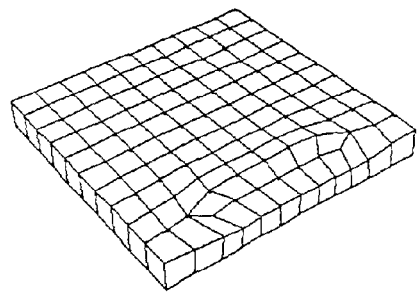

Figure 8. A slice of the volume of Figure 7 to show the internal hexes.

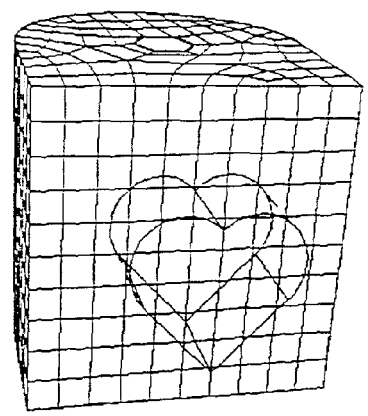

Figure 11. Swept volume with through hole and heart-shaped branch before grafting.

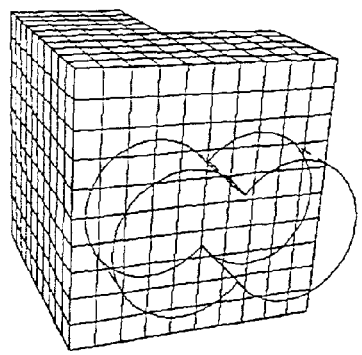

Figure 9. Submapped trunk with figure eight branch before grafting.

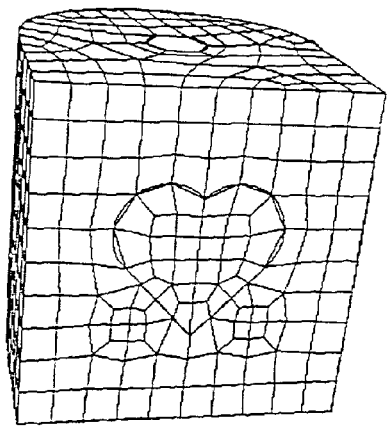

Figure 12. Cut away view of base surface after grafting.

METHOD FOR GENERATING A MESH REPRESENTATION OF A REGION CHARACTERIZED BY A TRUNK AND A BRANCH THEREON

PRIORITY CLAIM

This application claims priority to provisional application 60/226,444 "The Graft Tool: An All-Hexahedral Transition Algorithm for Creating a Multi-Directional Swept Volume Mesh", filed Aug. 17, 2000, incorporated herein by reference.

This invention was made with Government support under Contract DE-AC04-94AL85000 awarded by the U.S. Department of Energy. The Government has certain rights in the invention.

BACKGROUND OF THE INVENTION

This invention relates to the field of meshing, specifically using a computer to generate computer-readable mesh representations of trunk/graft regions for use in, for example, finite element modeling of mechanical systems.

Three-dimensional finite element analysis (FEA) is an important design tool for physicists and engineers. Before the analysis can begin, a mesh needs to be generated on the model. During the last several decades, much research has been devoted to mesh generation. Tetrahedral mesh generators are well developed and many have been implemented in software packages. Hexahedral mesh generators are not as well developed, however, and lack the automation of current tetrahedral mesh generators.

For most applications, hexahedral elements are preferred over tetrahedral elements for meshing 3-D solids. See, e.g., Benzley et al., "A Comparison of All-Hexahedral and All-Tetrahedral Finite Element Meshes for Elastic and Elasto-Plastic Analysis," *Proceedings 4$^{th}$ International Meshing Roundtable, Sandia National Laboratories* 95, pp. 179–191 (October 1995); Cifuentes and Kalbag, "A Performance Study of Tetrahedral and Hexahedral Elements in 3-D Finite Element Structural Analysis," *Finite Elements en Analysis and Design*, Vol. 12, pp. 313–318 (1992). Unfortunately, a high quality mesh of hexahedral elements can be more difficult to generate. Minimally, the mesh needs to be conformal between adjoining solids and have high quality elements at the bounding surfaces. Because of the constraints on hexahedral elements, automatic generation of high quality hexahedral meshes on arbitrary 3-D solids has proven elusive. See, e.g., Mitchell, "A Characterization of the Quadrilateral Meshes of a Surface Which Admit a Compatible Hexahedral Mesh of the Enclosed Volume," *Proceedings, 13$^{th}$ Annual Symposium on Theoretical Aspects of Computer Science (STACS '96), Lecture Notes in Computer Science* 1046, Springer, pp. 465–476 (1996).

Over the last several years much work has been put into sweeping algorithms. These algorithms can mesh a wide range of 2½-D (prismatic) solids. The sweeping algorithms generally take a 2-D unstructured quadrilateral mesh from the source surface and project it through the volume to the target surface. Sweeping algorithms have matured to handle nonplanar, non-parallel source and target surfaces and variable cross-sectional area as well as multiple source and target surfaces. See, e.g., Staten et al., "BMSweep: Locating Interior Nodes During Sweeping," *Proceedings 7$^{th}$ International Meshing Roundtable* 98, pp. 7–18 (October 1998); Blacker, "The Cooper Tool," *Proceedings 5$^{th}$ International Meshing Roundtable* 96, pp. 13–29 (October 1996); Mingwu and Benzley, "A Multiple Source and Target Sweeping Method for Generating All Hexahedral Finite Element Meshes" *Proceedings, 5$^{th}$ International Meshing Roundtable* 96, pp. 217–225 (October 1996).

To maintain the structured mesh in the sweep direction, current sweeping algorithms require the linking surfaces (those that connect the source to the target) to be mappable or submappable. This constraint limits the number of solids that can be meshed with these algorithms. They specifically exclude solids with imprints or protrusions on the linking surfaces, a geometry common in many problems. Accordingly, there is a need for new meshing methods that remove this constraint on linking surfaces.

SUMMARY OF THE INVENTION

The present invention provides a meshing method, called grafting, that lifts the prior art constraint on linking surfaces. The grafting method locally modifies the structured mesh of the linking surfaces allowing the mesh to conform to additional surface features. Thus, the grafting method can provide a transition between multiple sweep directions extending sweeping algorithms to 2¾-D solids. The method is also suitable for use with non-sweepable volumes; the method provides a transition between meshes generated by methods other than sweeping as well.

The method also provides a transition between sweepable volumes in the same sweep direction. The branch volume may abut a source or target surface of the trunk volume. Traditionally, features of the branch volume need to be present in the trunk surface. However, with grafting, a conforming mesh can be created between the two volumes even when this is not the case. In general, the trunk volume mesh need not be a swept mesh. The "linking" surface mesh need not be mapped or submapped, but is merely described as such herein for simplicity of exposition. All that is necessary is that the trunk surface mesh can be moved or modified as described below so as to align with the branch geometry, independent of whether the trunk surface mesh is on a linking or a source or target surface.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

FIG. 1 is an illustration of a trunk/graft geometry.

FIG. 2 is an illustration of an example graft surface with underlying structured mesh from the base surface.

FIG. 3 is an illustration of an example graft surface with node of intersecting edges moved to a boundary loop.

FIG. 4 is an illustration of an example graft surface after smoothing the base surface mesh to a boundary loop.

FIG. 5 is an illustration of an example graft surface after insertion of a pillow of elements directly inside the boundary loop.

FIG. 6 is an illustration of a mapped trunk mesh with a cylindrical branch before grafting.

FIG. 7 is an illustration of a branch base surface after grafting.

FIG. 8 is an illustration of a slice of the volume of a mesh after grafting.

FIG. 9 is an illustration of a submapped trunk with a figure eight branch before grafting.

FIG. 10 is an illustration of a branch base surface after grafting.

FIG. 11 is an illustration of a swept volume with a through hole and a heart-shaped branch before grafting.

FIG. 12 is a branch base surface after grafting.

DETAILED DESCRIPTION OF THE INVENTION

The present invention provides a meshing method, called grafting, that lifts the prior art constraint on linking surfaces. The grafting method locally modifies the structured mesh of the linking surfaces allowing the mesh to conform to additional surface features. Thus, the grafting method can provide a transition between multiple sweep directions extending sweeping algorithms to 2¾-D solids. The method is also suitable for use with non-sweepable volumes; the method provides a transition between meshes generated by methods other than sweeping as well.

The method also provides a transition between sweepable volumes in the same sweep direction. The branch volume may abut a source or target surface of the trunk volume. Traditionally, features of the branch volume need to be present in the trunk surface. However, with grafting, a conforming mesh can be created between the two volumes even when this is not the case. In general, the trunk volume mesh need not be a swept mesh. The "linking" surface mesh need not be mapped or submapped, but is merely described as such herein for simplicity of exposition. All that is necessary is that the trunk surface mesh can be moved or modified as described below so as to align with the branch geometry, independent of whether the trunk surface mesh is on a linking or a source or target surface.

The grafting method can be used, for example, with a single solid, and with a set of connected solids, producing conformal meshes between them. For ease of presentation, the 2¾-D solid discussed is assumed to be a single solid. Those skilled in the art will appreciate other variations that are suitable for use with the present invention. The grafting method is especially well-suited for solids with one major sweep direction with imprints or protrusions cluttering the linking surfaces. FIG. 1 shows a sample 2¾-D solid.

Often the central and largest part of the solid is the major sweep direction and will be known hereafter as the trunk. The trunk can have protrusions from the linking surfaces that are subvolumes; often, the subvolumes are sweepable. These subvolumes are termed branches. The linking surface on the trunk that contains one or more branches is termed a base surface and begins with a structured mesh. The intersection of the trunk and branch is defined as a graft surface or a boundary surface.

The grafting method can create a conformal mesh composed of high quality elements between the trunk and the branches. The method can be viewed as three major steps: meshing of the trunk, modification of the base surface mesh at the graft surface, and meshing of the branch. Each of these steps will be described in the following sections.

Meshing the Trunk

The first step in the grafting method is to obtain a mesh on the trunk. The trunk is often defined such that a structured meshing algorithm can create a successful mesh on it. In the examples used in this paper, the trunks are meshed with either volume mapping, submapping, or sweeping algorithms. See, e.g., White, "Automatic, Quadrilateral and Hexahedral Meshing of Pseudo-Cartesian Geometries using Virtual Decomposition," *Master's Thesis, Brigham Young University* (August 1996). It is not necessary, however, for the trunk to have a structured mesh on it. For severely complicated solids, it can be difficult to find a simple trunk. In these cases, it can be desirable to use an unstructured algorithm (e.g. Whisker Weaving, Plastering, or Hex-Tet) to mesh the more complicated trunk and then use the grafting algorithm to create a transition to a more structured branch. See, e.g., Tautges et al., "The Whisker Weaving Algorithm: A Connectivity-based Method for Constructing All-hexahedral Finite Element Meshes," *International Journal for Numerical Methods in Engineering*, Vol. 39, pp. 3328–3349 (1996); Canann, "Plastering: A New Approach to Automated, 3-D Hexahedral Mesh Generation," *American Institute of Aeronautics and Astronics*, (1992); Meyers et al., "The "Hex-Tet" Hex-Dominant Meshing Algorithm as Implemented in CUBIT;" *Proceedings 7th International Meshing Roundtable* 98, pp. 151–158, (October 1998), all incorporated herein by reference.

Regardless of the mesh scheme, the element size assigned to the trunk can be important. The mesh preferably should be fine enough to resolve all small features of the trunk and the graft surface.

Creating the Graft

Once the trunk is meshed, the branches can be grafted into the base surface mesh. FIG. 2 shows a sample graft surface with the underlying structured mesh of the base surface.

Each graft surface can be located on the mesh. The graft surface can be separated into individual loops of curves that define the surface boundary. Each loop can be temporarily meshed with a one-dimensional mesh that is twice as fine as the underlying mesh on the base surface. This approximates the curve loop with a closed set of linear line segments.

The mesh elements on the loop can be traversed to find the set of mesh edges on the base surface that intersect the loop. A simple three-dimensional linear intersection routine can be used to determine where each of these intersections occurs. In FIG. 2, these intersected edges are highlighted with bold lines. Once the intersected edges of the base surface are located, the temporary mesh on the loop can be deleted.

Smoothing the Mesh to the Loop

The surface mesh can then be adjusted to conform to the loop. Using the set of intersecting mesh edges and the corresponding intersection locations, the closest node on each edge can be moved to the loop. If two nodes are comparably close, the adjacent intersecting edges can be checked to determine which node to move. The node that produces the highest quality quadrilaterals can be moved. FIG. 3 shows the modified surface mesh after the nodes have been moved.

The final quality of the quadrilateral mesh inside the loop is limited by the resolution of the original mesh on the base surface and by the number of mesh faces that are diagonally intersected by the loop. Unfortunately, this smoothing procedure can result in the poorest quality mesh faces at the loop boundary.

The quality of the hexahedral mesh of the trunk immediately under the base surface can also be an important consideration. Generally, the further the surface nodes are moved, the poorer the quality of the underlying hexahedral mesh. This smoothing process can produce hexes with negative Jacobians. The quality can be improved slightly by a smooth on the volume, though the computational expense of the smooth can exceed the benefits in improved quality. Additional steps, described below, can further improve mesh quality.

Refining Inside the Loop

High quality elements near the surfaces of the solid can be important. The quality of the elements at the surface of the branch can be affected by the quality of the quadrilaterals immediately inside the bounding loops of the graft surface. In FIG. 4, the poorest quality elements are at the bounding loop of the graft surface. To improve the quality of these elements, a refinement scheme can be used that modifies the mesh connectivity locally.

The refinement scheme can be understood by inspection of the Spatial Twist Continuum (STC), or dual of the mesh. See, e.g., Murdock and Benzley, "The Spatial Twist Continuum", *Proceedings, 4th International Meshing Roundtable* 95, pp. 243–251 (October 1995). A complete STC sheet can be inserted directly inside the bounding loops of the graft surface. The sheet passes behind the first layer of hexes in the trunk creating a pillow of new hexes inside the loop. See, e.g., Mitchell and Tautges, "Pillowing Doublets: Refining a mesh to ensure that faces share at most one edge" incorporated herein by reference. Thus, the connectivity of the interior side of the hexes can remain unchanged. This can insure that the connectivity modification is local, especially on thin solids.

This process was applied to the mesh of FIG. 4 and the resulting surface mesh is shown in FIG. 5. Though only the surface mesh is shown, the new layer of hexes wraps around behind the existing hexes using the corner primitive suggested in Murdoch and Benzley. The new layer of elements shows an improvement in quality and moves the lower quality elements to the center of the graft surface.

Improving Quality Outside the Loop

Before leaving the base surface, the elements immediately outside the loop can be surveyed for poor quality. As mentioned above, some of these elements can have negative Jacobians due to the movement of the nodes. These quality issues can be corrected by inserting another STC sheet away from the loop. Finally, the mesh on the base surface can be smoothed to optimize the node locations.

Meshing the Branches

When the quality of the mesh on the base surface is acceptable, the branch can be meshed. The set of quadrilateral elements inside the graft surface can be defined as the source mesh for a sweeping algorithm. This mesh can then swept through to the end of the branch.

Previously it was mentioned that the trunk could be meshed with any volume mesh scheme, though most often a structured scheme was chosen. The same is true with the branches. Often the branches are sweepable subvolumes with the graft surface as the source surface. However, any scheme, structured or unstructured, can be used to mesh the branches using the existing mesh on the graft surface.

EXAMPLES

Shown below are three simple examples of the grafting algorithm. FIG. 6 shows a block-shaped trunk with a mapped volume mesh. The branch is a cylindrical protrusion from the trunk. The results of the grafting algorithm can be seen in FIG. 7. The branch has been cut away to show the details of the base surface. Notice the high quality elements inside the graft surface. Further refinement was done outside the graft surface to improve the quality of the mesh.

FIG. 8 shows a slice from the center of the volume mesh from FIG. 7. It is easy to see the layer of hexes that were added directly beneath the graft surface. Notice that the volume mesh is completely conformal. Additionally, all the hexes are of acceptable quality.

The trunk in FIG. 9 was meshed with a volume submap algorithm. The branch is in the shape of a figure eight to show how the grafting algorithm handles the cusps. The results of the algorithm can be seen in FIG. 10. The grafting algorithm again produced high quality elements at the bounding loop of the graft surface. This time there were no quality issues outside of the graft surface.

Finally, FIG. 11 shows a trunk with a swept volume mesh. Notice that there is a through hole down the center of the trunk. The heart-shaped branch protruding from the trunk complicates the meshing of the solid. It cannot be easily meshed with any of the structured meshing algorithms. The grafting algorithm is able to produce a high quality mesh on the solid. FIG. 12 shows the base surface after grafting the mesh.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A method, practiced on a computer, of generating a mesh representation of a region characterized by a trunk and a branch thereon, comprising:
   a) Determining a first trunk mesh;
   b) Determining a second trunk mesh by adjusting the portion of the first mesh proximal the boundary surface between the trunk and the branch to substantially conform thereto;
   c) Determining a branch mesh from the portion of the second mesh within said boundary surface and the geometry of the branch; and
   d) Displaying the mesh representation on a computer screen.

2. The method of claim 1, wherein the trunk comprises a 2½-dimensional region, and wherein determining a first trunk mesh comprises sweeping the volume of the trunk.

3. The method of claim 1, wherein the branch comprises a 2½-dimensional region, and wherein determining a branch mesh comprises sweeping the volume of the branch.

4. The method of claim 1, wherein determining a second trunk mesh comprises:
   a) Determining the boundary of said boundary surface;
   b) Determining a 1-dimensional mesh at least twice as fine as the first trunk mesh along said boundary;
   c) Identifying pairs of nodes of the first trunk mesh defining intersections of the 1-dimensional mesh and the first trunk mesh; and
   d) Moving a node from each pair to said boundary.

5. The method of claim 4, wherein moving a node comprises determining which node of each pair will, if moved, produce the highest quality mesh elements, and moving that node.

6. The method of claim 4, wherein moving a node comprises determining which node of each pair is closest to the boundary, and moving that node.

7. The method of claim 4, wherein determining a second trunk mesh further comprises determining if the boundary spans the diagonal of any element of the second trunk mesh after moving nodes to the boundary, and if so, then moving one of the other nodes of said element to the boundary.

8. The method of claim 4, wherein determining a second trunk mesh further comprises smoothing the portion of the first trunk mesh inside the boundary after moving nodes to the boundary.

9. The method of claim 4, wherein determining a second trunk mesh further comprises smoothing the portion of the first trunk mesh outside the boundary after moving nodes to the boundary.

10. The method of claim 4, wherein determining a second trunk mesh further comprises adding a pillow of mesh elements directly inside the boundary.

11. The method of claim 4 wherein determining a second trunk mesh further comprises smoothing the portion of the first trunk mesh beneath the boundary surface after moving nodes to the boundary.

12. A method of using a computer to generate a computer-readable mesh representation of a region characterized by a computer-readable representation of a trunk and a computer-readable representation of a branch thereon, comprising:
   a) Determining a first trunk mesh from the computer-readable representation of the trunk;
   b) Determining a second trunk mesh by adjusting the portion of the first mesh proximal the boundary surface between the trunk and the branch to substantially conform thereto;
   c) Determining a branch mesh from the portion of the second mesh within said boundary surface and the geometry of the branch; and
   d) Displaying the computer-readable mesh representation on a computer screen.

13. The method of claim 12, wherein the trunk comprises a 2½-dimensional region, and wherein determining a first trunk mesh comes sweeping the volume of the trunk.

14. The method of claim 12, wherein the branch comprises a 2½-dimensional region, and wherein determining a graft mesh comprises sweeping the volume of the branch.

15. The method of claim 12, wherein determining a second trunk mesh comprises:

a) Determining the boundary of said boundary surface;
   b) Determining a 1-dimensional mesh at least twice as fine as the first trunk mesh along said boundary;
   c) Identifying pairs of nodes of the first trunk mesh defining intersections of the 1-dimensional mesh and the first trunk mesh; and
   d) Moving a node from each pair to said boundary.

16. The method of claim 15, wherein moving a node comprises determining which node of each pair will, if moved, produce the highest quality mesh elements, and moving that node.

17. The method of claim 15, wherein moving a node comprises determining which node of each pair is closest to the boundary, and moving that node.

18. The method of claim 15, wherein determining a second trunk mesh further comprises determining if the boundary spans the diagonal of any element of the second trunk mesh after moving nodes to the boundary, and if so, then moving one of the other nodes of said element to the boundary.

19. The method of claim 15, wherein determining a second trunk mesh further comprises smoothing the portion of the first trunk mesh inside the boundary after moving nodes to the boundary.

20. The method of claim 15, wherein determining a second trunk mesh further comprises smoothing the portion of the first trunk mesh outside the boundary after moving nodes to the boundary.

21. The method of claim 15, wherein determining a second trunk mesh further comprises adding a pillow of mesh elements directly inside the boundary.

22. The method of claim 15 wherein determining a second trunk mesh further comprises smoothing the portion of the first trunk mesh beneath the boundary surface after moving nodes to the boundary.

* * * * *